Figure 1:
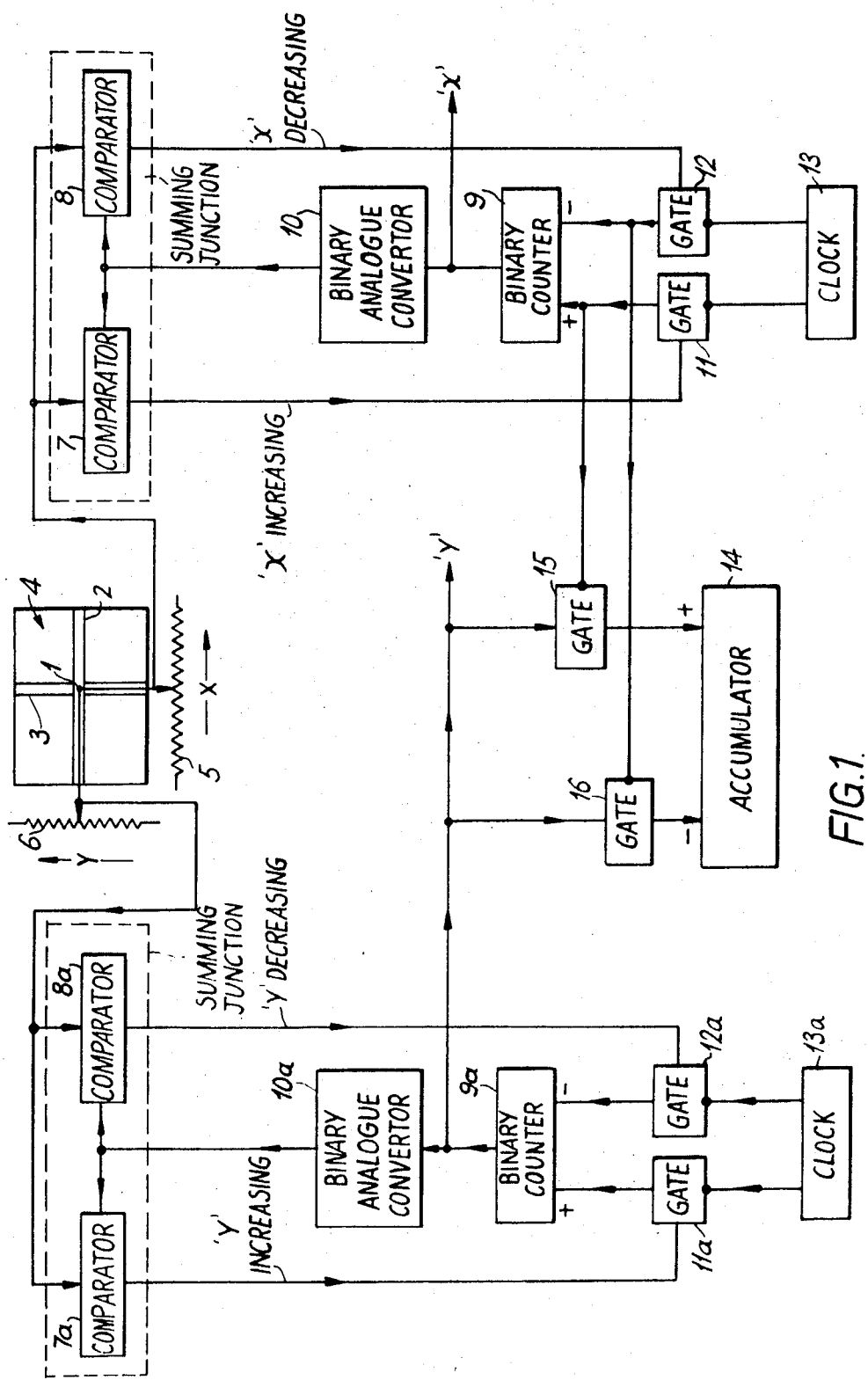

United States Patent
Lewin

[15] 3,652,842
[45] Mar. 28, 1972

[54] AREA MEASUREMENT

[72] Inventor: John Ernest Lewin, 30 Lyndhurst Ave., Mill Hill, London, N.W. 7, England

[22] Filed: Feb. 5, 1970

[21] Appl. No.: 8,805

[52] U.S. Cl. ..........................235/183, 235/61.6 A, 33/123
[51] Int. Cl. .........................................................G06g 7/18
[58] Field of Search ...................235/61.6 A, 61.6 B, 150.51, 235/183; 33/123

[56] References Cited

UNITED STATES PATENTS 3,103,578  9/1963  Dietrich, Jr.......................235/150.51

Primary Examiner—Eugene G. Botz
Attorney—Cushman, Darby & Cushman

[57] ABSTRACT

Apparatus for measuring an unknown area within a predetermined area, comprising: a pointer movable over the predetermined area by an operator to track the boundary of the unknown area; first and second means movable with the pointer to define co-ordinates for the pointer position within the predetermined area, the first such means generating first electrical signals at regularly spaced intervals along one co-ordinate axis to represent a graticule, and the second such means generating second electrical signals proportional to the spacing of the pointer position along the other co-ordinate axis from a reference position; means for interrogating the second signals in response to each of the first signals as the unknown area boundary is tracked; and means for summing the interrogated second signals to indicate the unknown area.

5 Claims, 2 Drawing Figures

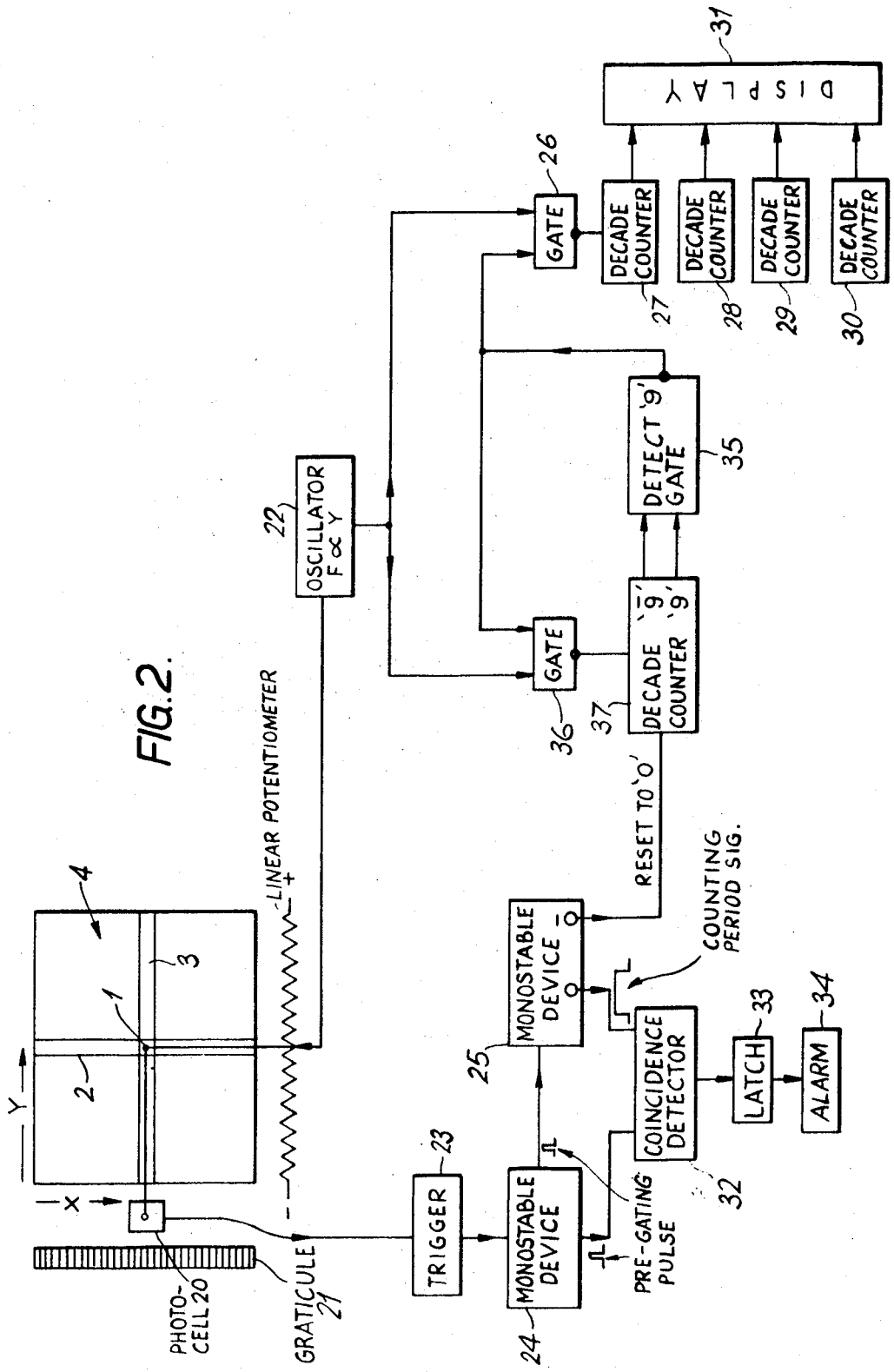

AREA MEASUREMENT

Research projects frequently produce graphical records which require analysis to produce quantitative results and, in turn one of the most frequent requirements in this respect is the measurement of area enclosed by a boundary which may require skilled identification. Difficulty in this respect arises particularly when no graphical record is available, but instead analysis is required on the basis of a projected image, as is commonly the case in quantitative immunoelectrophoresis.

An object of the present invention is to provide apparatus for producing a direct measure of such an area while the associated boundary is identified.

To this end the present invention provides apparatus for measuring an unknown area within a predetermined area, comprising: a pointer or the like movable over the predetermined area by an operator to track the boundary of the unknown area; first and second means movable with the pointer to define co-ordinates for the pointer position within the predetermined area, the first such means generating first electrical signals at regularly spaced intervals along one co-ordinate axis to represent a graticule, and the second such means generating second electrical signals proportional to the spacing of the pointer position along the other co-ordinate axis from a reference position; means for interrogating the second signals in response to each of the first signals as the unknown area boundary is tracked; and means for summing the interrogated second signals to indicate the unknown area.

In order that the invention may be more clearly understood, the same will now be described by way of example with reference to the accompanying drawings, in which FIGS. 1 and 2 schematically illustrate respectively different embodiments of the invention.

More particularly, FIG. 1 shows a pointer 1 mounted for movement on mutually perpendicular cross-slides 2 and 3 over a predetermined rectangular area 4. The pointer is also coupled to the sliders of potentiometers 5 and 6 whereby the potentiometer output voltages represent the Cartesian co-ordinates $(x, y)$ of the pointer position within the area 4. These output voltages are applied to respective digital voltmeters of the tracking converter type which are of like form so that only one need be described in more detail.

Considering the X co-ordinate output from potentiometer 5, this is applied to a summing junction represented by two comparators 7 and 8. Also, the output from an "up-down" binary counter 9 representing the X co-ordinate of the previous position of the pointer is applied to the summing junction by way of a binary analogue converter 10. The summing junction provides two outputs representing the algebraic differences between the X co-ordinates of the current and previous positions of the pointer, and these outputs are applied to open respective gates 11 and 12 depending upon whether the current co-ordinate is greater or less than the previous one. The effective use of two comparators is preferred in order to obtain a stable null condition, although a single comparator arrangement giving similar stability would be equally suitable.

The gates 11 and 12 control outputs from a clock pulse generator 13 which are connected to cause the counter to count up and down respectively.

Thus, if the pointer is moved from one position to another involving a change in X co-ordinate, pulses are applied to the counter in an appropriate additive or substractive sense until the counter output balances the potentiometer output. Moreover, the relevant comparator output signal must attain a predetermined level to open gate 11 or 12, and it follows that application of each pulse to the counter represents a constant magnitude of change in X co-ordinate. The pulse train output from the pulse generator to the counter can accordingly be utilized as an electronic graticule and, since this pulse train is separated by the gates 11 and 12 for increase or decrease of X co-ordinate, the graticule is direction sensitive.

The Y co-ordinate output from potentiometer 6 is, as noted above, dealt with in the same way and the relevant components are denoted by the same reference numerals with the addition of an $a$.

For area measurement, the Y co-ordinate output from counter 9a is used as a measure of the area of a strip of height $y$ and width $\delta x$, the latter dimension corresponding to the incremental change in X co-ordinate represented by a pulse from generator 13. In order to provide a direct indication of an area traced out by the pointer, the successive strip areas are algebraically summed in response to the pulses applied to counter 9. Thus, the digital output from counter 9a is applied to an accumulator 14 in an additive and subtractive sense through gates 15 and 16 which are opened in response to pulses from gates 11 and 12, respectively.

The use of a direction sensitive graticule and the consequent ability to subtract negative components of area is advantageous in that areas defined by re-entrant or closed loop boundaries can be measured. Also, if an operator tracing a boundary with the pointer overshoots or otherwise moves the pointer off the boundary, correction can be effected by re-tracing the incorrect movement.

In addition to providing a direct indication of area, outputs representing the X and Y co-ordinates can be taken from the counters 9 and 9a for recording, such as by way of punched paper tape, and subsequent computer analysis. Also, if the boundary being traced does require identification by a skilled operator, a pen recorder can be coupled for movement with the pointer, or in response to a computer or other automatic plotting aid operated in response to the aforementioned punched paper tape, to produce a more definite record of the boundary.

Turning to the embodiment of FIG. 2, a pointer 1 is again mounted for movement on mutually perpendicular cross-slides 2 and 3 over a predetermined rectangular area 4. In this instance, the pointer is coupled for movement in the X co-ordinate direction with a photocell 20, itself movable along one side of an optical graticule 21 so that the photocell is only illuminated through successive divisions of the graticule, and coupled for movement in the Y co-ordinate direction with a variable component of an oscillator 22, which component may conveniently be a linear potentiometer. The optical graticule and photocell can, of course, be replaced by any other suitable digitiser.

In the more general operation of this embodiment the frequency of the oscillator output varies linearly with the Y co-ordinate and a digital representation of $y$ is obtained by counting the oscillator output pulses for a fixed period of time as each graticule division is passed. The pointer movement along the X co-ordinate during each counting period represents a relatively uniform increment $\delta x$ and the accumulation of the associated $y$ - representing counts represents the unknown area.

More particularly in the FIG. 2, the photocell output is differentiated at 23 to provide a trigger pulse as the photocell first passes each division of the graticule. This pulse is applied to a monostable device 24 which provides a pre-gating pulse of 0.2 ms. duration, say.

The trailing edge of the pre-gating pulse is applied to a further monostable device 25 to provide a counting period signal of 2 ms. duration, say. The counting period signal is applied to open a gate 26 to which the output from oscillator 22 is also applied, whereby the oscillator output pulses are passed for the duration of the counting period to decade counters 27 to 30 to additively accumulate the same and display the accumulated result at 31.

In this second embodiment two precautions are preferably adopted in practice. Firstly, it is clearly undesirable that the pointer be moved so rapidly in the X co-ordinate direction that a further graticule division be passed before the counting period for the preceding division is terminated. In order to give warning of this event, the pre-gating pulse outputs from monostable 24 and the counting period signals from monostable 25 are applied to a coincidence detector 32, and any output from this detector sets a latch 33 which activates an alarm 34. In fact, in addition to activating the alarm, the latch can also be arranged to reset the apparatus so that the area measurement must be started again to avoid the error which would otherwise exist in the accumulated count by overlapping two counting periods.

The second precaution takes account of the fact that there is practical difficulty in providing an oscillator 22 with the desired substantially linear characteristic in the region of zero frequency. Accordingly, a low frequency is taken as a datum for the Y co-ordinate and this is subtracted from the output of oscillator 22 during each counting period.

For this purpose gate 26 is opened, from a normally closed state, by an output from a gate 35 only after the datum frequency count to be subtracted has passed through a further gate 36 to which the oscillator output is applied. The oscillator output pulses passed by the gate 36 are applied in turn to a decade counter 37 which is normally held inactive at zero by the monostable 25 in its stable state. However, when monostable 25 fires to provide a counting period signal, the decade counter 37 is free to count. Gate 35 detects a count of "9" in the counter 37 and responds to open gate 26 for passage of oscillator pulses to the decade counters 27 to 30. Thus the first nine oscillator output pulses during a counting period are not counted, nine being a suitable value of low frequency for datum purposes. As soon as the counting period terminates, as determined by return of monostable 25 to its stable state, the decade counter 37 is reset to zero and gate 26 to the accumulator is closed. Also, it is to be noted that an output from gate 35 closes gate 36 for the remainder of the relevant counting period.

Unlike the embodiment of FIG. 1, that of FIG. 2 is not direction sensitive for movement along the X-axis and the pointer must therefore be moved in one direction only for each scan. In practice, attempts to correct for overshoot can be nullified by arranging for obviously discernible backlash in reverse movement along the X-axis.

While the present invention has been more particularly described with reference to the two illustrated embodiments, it is not intended to be limited thereto, since other such embodiments can be provided within the more general scope of the invention. For example, the embodiment of FIG. 1 can be modified to all digital form by the use of digitisers in place of the potentiometers, together with appropriate changes elsewhere. Also, the embodiment of FIG. 2 could be augmented to be direction sensitive.

I claim:

1. Apparatus for measuring an unknown area within a predetermined area, comprising:

a pointer movable over the predetermined area by an operator to track the boundary of the unknown area;

first and second means movable with the pointer to define co-ordinates for the pointer position within the predetermined area, the first such means generating first electrical signals at regularly spaced intervals along one co-ordinate axis to represent a graticule, and the second such means generating second electrical signals proportional to the spacing of the pointer position along the other co-ordinate axis from a reference position;

means for interrogating the second signals in response to each of the first signals as the unknown area boundary is tracked; and means for summing the interrogated second signals to indicate the unknown area;

wherein said first means includes a digitiser for generating said first signals, means for defining a predetermined counting period in response to each of said signals, and wherein said second means includes a variable frequency oscillator for generating said second signals, an accumulator to count said second signals during each of said counting periods; and means to inhibit counting of said second signals by said accumulator for a predetermined relatively low count value at the beginning of each of said counting periods.

2. Apparatus according to claim 1 comprising a normally closed first gate connecting said oscillator and said accumulator, and a counter, normally held at a first predetermined count state, but responsive to said oscillator during a counting period to attain a second predetermined count state representing said low count value and thereupon to open said first gate.

3. Apparatus according to claim 2 comprising a first monostable device response to each of said first signals to generate a pregating pulse, a second monostable device responsive to the trailing edge of each of said pulses to generate a predetermined counting period signal to activate said counter for counting, and a second gate responsive to said second count state of said counter to open said first gate.

4. Apparatus according to claim 3 comprising a third normally open gate connecting said oscillator and said counter, but closed in response to said second count state of said counter.

5. Apparatus according to claim 3 comprising a coincidence detector responsive to said pre-gating pulses and said counting period signals, and an alarm indicator activated by operation of said detector.

* * * * *

UNITED STATES PATENT OFFICE
CERTIFICATE OF CORRECTION

Patent No. 3,652,842     Dated March 28, 1972

Inventor(s) LEWIN, John Ernest

It is certified that error appears in the above-identified patent and that said Letters Patent are hereby corrected as shown below:

In the Heading add --claims priority application Great Britian, February 6, 1969, 6512/69--.

Signed and sealed this 5th day of September 1972.

(SEAL)
Attest:

EDWARD M. FLETCHER, JR.　　　　　　　ROBERT GOTTSCHALK
Attesting Officer　　　　　　　　　　　Commissioner of Patents